(12) United States Patent
Dietl

(10) Patent No.: US 12,280,704 B2
(45) Date of Patent: Apr. 22, 2025

(54) BEVERAGE HOLDER DEVICE FOR A VEHICLE

(71) Applicant: Lisa Draexlmaier GmbH, Vilsbiburg (DE)

(72) Inventor: Guenter Dietl, Hohenpolding (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 331 days.

(21) Appl. No.: 17/858,096

(22) Filed: Jul. 6, 2022

(65) Prior Publication Data

US 2023/0013679 A1    Jan. 19, 2023

(51) Int. Cl.
*B60N 3/10* (2006.01)

(52) U.S. Cl.
CPC ............. *B60N 3/102* (2013.01); *B60N 3/106* (2013.01)

(58) Field of Classification Search
CPC ................................ B60N 3/102; B60N 3/106
USPC ......................................................... 224/544
See application file for complete search history.

(56) References Cited

U.S. PATENT DOCUMENTS

| | | | | |
|---|---|---|---|---|
| 5,102,085 A * | 4/1992 | Wieczorek | ............. | B60N 3/102 248/311.2 |
| 6,834,838 B2 * | 12/2004 | Dennis | ................... | B60N 3/103 403/349 |
| 8,439,438 B2 * | 5/2013 | Oldani | ................... | B60N 3/102 297/188.14 |
| 9,706,865 B2 * | 7/2017 | Shen | ................. | A47G 23/0216 |
| 10,850,656 B2 * | 12/2020 | Garcia Salgado | ...... | H02J 50/10 |
| 11,772,538 B2 * | 10/2023 | Jiang | ..................... | B60N 3/108 296/24.34 |
| 2013/0264339 A1 * | 10/2013 | Oldani | ................... | B60N 3/102 220/8 |
| 2018/0029514 A1 * | 2/2018 | Salinas | ................. | B60N 3/105 |
| 2018/0208094 A1 * | 7/2018 | Medina Luna | .......... | B60N 3/10 |

(Continued)

FOREIGN PATENT DOCUMENTS

| CN | 112677854 | * | 4/2021 |
|---|---|---|---|
| DE | 102018123087 A1 | | 3/2019 |

OTHER PUBLICATIONS

Official Communication from the German Patent Office for 0832021-EN-NP, dated Feb. 24, 2022 (in German).

(Continued)

*Primary Examiner* — Peter N Helvey
(74) *Attorney, Agent, or Firm* — BelayIP

(57) ABSTRACT

The disclosure relates to a beverage holder device for a vehicle, which is adjustable between a stowed position and at least one position of use, with a storage element providing a storage surface for the beverage container, which, in the position of use, provides a bottom surface of a receptacle for the beverage receptacle, a beverage holder which, in the position of use, is set up to provide a wall which delimits the periphery of the receptacle and, in the stowed position, terminates flush with the storage surface or below the storage surface, wherein the cup holder forms a helical engagement with a further member, and a drive means comprising a drive member adapted to initiate a rotational movement of the cup holder relative to the further member, whereby the cup holder can be adjusted in height relative to the storage member for adjusting the cup holder means between the stowed position and the use position.

8 Claims, 2 Drawing Sheets

(56) References Cited

U.S. PATENT DOCUMENTS

2019/0084463 A1     3/2019   Boundy et al.
2023/0411998 A1*   12/2023   Bowles .................. H02J 50/10

OTHER PUBLICATIONS

Official Communication from the German Patent Office for 0832021-EN-NP, dated Feb. 24, 2022 (in English).

* cited by examiner

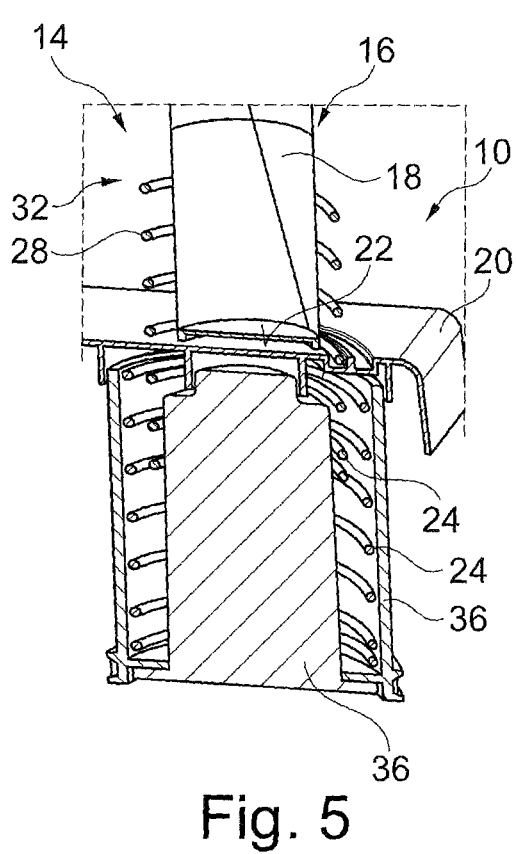 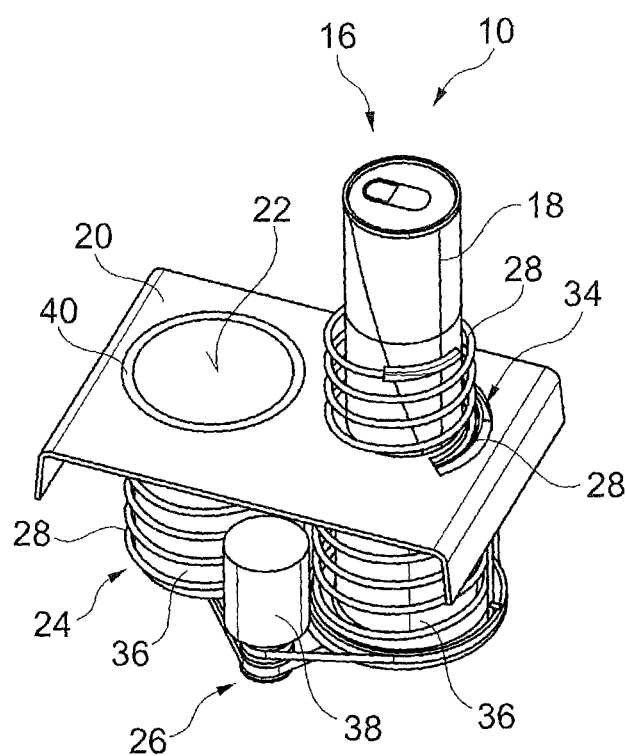
Fig. 5　　　　　Fig. 6
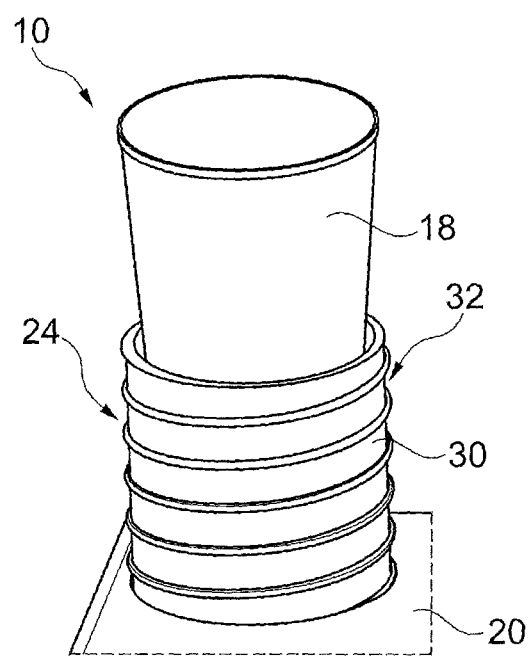 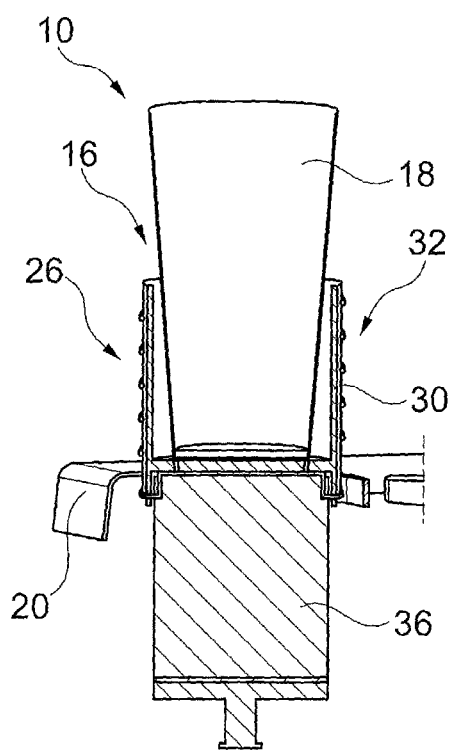
Fig. 7　　　　　Fig. 8

BEVERAGE HOLDER DEVICE FOR A VEHICLE

CROSS REFERENCE TO RELATED APPLICATIONS

This application claims priority to German patent application 102021116836.8, filed Jun. 30, 2021, the content of which is herein incorporated by reference.

BACKGROUND OF THE INVENTION

Field of the Invention

The invention relates to a cup holder device for a vehicle.

Description of Related Art

Especially when not in use, cupholders can represent an open area, which is unattractive. In order to be able to hold different containers securely, a large or optimum adjustment depth and the ability to cover different diameters are essential. For this purpose, there are a large number of variants of compensating elements in series-produced vehicles that adapt to the diameter of the container to be held and hold the container in place in the cupholder by means of spring force. The holding force achieved and the function of the cupholders is always a compromise, since it is important to keep adjustment forces and removal forces as low as possible and at the same time a particularly high holding force is desired for the set container.

BRIEF SUMMARY OF THE INVENTION

The object of the present invention is to provide a beverage holder device which is particularly well stowed when not in use.

This task is solved according to the invention by the subject-matter of the independent patent claim. Further possible embodiments of the invention are disclosed in the subclaims, the description and the figures.

The invention relates to a beverage holder device for a vehicle, in particular for a motor vehicle, in particular for a motor vehicle, which can be adjusted between a stowed position and at least one use position. The beverage holder device is adapted to hold a beverage container in the use position. The beverage holder device comprises a storage element which provides a storage surface for the beverage container and which, in the position of use, provides a bottom surface of a receptacle for the beverage container. The beverage container can be received in this receptacle for secure holding of the beverage container in the beverage holder device. For receiving the beverage container in the receptacle, the beverage container can be placed on the storage element at least in the position of use.

The beverage holder device further comprises a beverage holder, which is designed to provide a peripheral wall delimiting the receptacle in the use position. Furthermore, the beverage holder is adapted to end flush with the storage surface or below the storage surface in the stowed position. The beverage holder forms a helical engagement with a further element. For this helical engagement, the cup holder and/or the further element can have a thread-like section. If the beverage holder has the thread-like portion, then the further element engages the thread-like portion of the beverage holder. If the further element has the thread-like portion, then the beverage holder engages the thread-like portion of the further element. Via the helical engagement, a rotational movement of the beverage holder and the further element relative to each other can initiate a translational movement of the beverage holder relative to the further element.

The beverage holder device further comprises a drive device, which comprises a drive element. This drive element is set up to trigger a rotational movement of the beverage holder relative to the further element. The further element is the storage element or the drive element. In particular, the drive element is set up to trigger a rotational movement of the beverage holder relative to the further element about a central axis of the beverage holder. By means of the rotational movement of the beverage holder relative to the further element, the height of the beverage holder relative to the storage element can be adjusted for adjusting the beverage holder device between the stowed position and the position of use. This means that by means of the drive element the beverage holder can be rotated relative to the drive element or relative to the storage element, whereby the translatory movement of the beverage holder relative to the storage element can be initiated. Via the translatory movement of the beverage holder relative to the storage element, the beverage holder can be adjusted in height relative to the storage element, in particular can be adjusted out over the storage surface or can be adjusted back flush with the storage surface or terminating behind the storage surface. In other words, the beverage holder device comprises the storage element on whose provided storage surface the beverage container can be placed. For an adjustment of the beverage holder device from the stowed position to the at least one use position, the beverage holder is adjusted upwardly relative to the storage surface when the beverage holder device is installed in the vehicle, as a result of which the beverage holder laterally delimits the receptacle. In the at least one position of use of the beverage holder device, the receptacle is thus limited downwardly by the storage surface provided by the storage element and laterally by the beverage holder.

The beverage holder device enables the receptacle in which the beverage container can be held to be provided in the at least one position of use, whereas in the stowed position the beverage holder recedes behind the storage surface or is flush with the storage surface, so that in the stowed position the receptacle is not available for holding the beverage container. In this way, the risk of soiling of the receptacle can be kept particularly low when the beverage holder device is arranged in the stowed position. In addition, the beverage holder device can be extended electrically and steplessly by means of the drive device in its setting depth or the height of the holder. When not in use, the cup holder can be stowed invisibly behind the storage element, at least substantially when viewed from above the storage surface. The cup holder device thus provides a closed clean surface when not in use. This integration allows for a clean design. Due to a variable adjustment depth of the beverage holder relative to the storage element, the holder can be optimally adapted to the beverage container to be held. No movable compensating elements are required for diameter adjustment in the cupholder device. In the installation space for a cup holder in the vehicle, two cup holders of different diameters can be accommodated, which are set up to securely hold beverage containers of different sizes relative to one another. In the at least one position of use, the cup holder device enables optimum holding of beverage containers, in particular due to a variable adjustment height of the cup holder relative to the storage element. Furthermore, the beverage holder device advantageously does not require any filigree movable holding elements.

In a further embodiment of the invention, it is provided that the beverage holder forms the helical engagement with the storage element as a further element, and that the drive element is arranged to set the beverage holder in rotation relative to the storage element. In this regard, the drive means may be adapted to cause the drive element to rotate relative to the storage element, wherein the beverage holder may be non-rotatably connected to the drive element. As a result, the beverage holder can be set in rotation relative to the storage element via the rotation of the drive element. Via the rotation of the beverage holder relative to the storage element and the helical engagement of the beverage holder with the storage element, the beverage holder can be moved translationally relative to the storage element when the beverage holder device is adjusted from the stowed position to the at least one use position, in particular can be screwed up relative to the storage surface and thus can be pushed out over the storage surface. By pushing the beverage holder out beyond the storage surface relative to the storage element, the receptacle is provided. Via the screw-shaped engagement of the beverage holder with the storage element, the beverage holder can be translationally moved relative to the storage element particularly precisely in dependence on a respective rotational position of the beverage holder relative to the storage element. In this way, a height of the holder can be set particularly precisely. A transmission ratio between a swept rotation angle of the beverage holder relative to the deposit element and a translatory height adjustment of the beverage holder relative to the deposit element can be specified via a pitch of the thread-like region. The steeper respective turns of the thread-like portion are, the greater the translational movement of the beverage holder relative to the storage element for a given rotational movement of the beverage holder relative to the storage element. Via the helical engagement, the beverage holder can be held particularly securely in any position relative to the storage element.

In this context, in a further development, it is provided that the cup holder comprises a spiral element which is adapted to provide the wall and which is guided in a spiral guide of the storage element, thereby providing the helical engagement between the cup holder and the storage element. For example, the helical member may be formed as a helical spring. The spiral-shaped guide may be a spiral channel or a threaded channel in the storage element. At least a partial area of the spiral element is arranged in the spiral-shaped guide of the storage element in any position of the beverage holder device, in order to enable safe adjustment of the beverage holder device. When adjusting the beverage holder device between the stowed position and the at least one use position, the spiral element is moved through the spiral guide of the storage element, thereby translating the beverage holder relative to the storage element. By arranging the spiral element in the spiral-shaped guide in certain areas, the extent to which the beverage holder protrudes beyond the storage surface is specified particularly precisely in each rotational orientation of the beverage holder relative to the storage element.

In a further embodiment of the invention, it is provided that the beverage holder is closed off by a ring element held at a free end of the spiral element, which ring element, in the position of use, bounds the holder towards its side facing away from the storage element. In particular, the ring element rests against an upper end of the spiral element or is fitted onto an upper end of the spiral element. This upper end is adjusted in its distance to the storage surface when the beverage holder device is adjusted between the stowed position and the at least one use position. In the at least one position of use, the ring element is arranged above the storage surface. The ring element can particularly minimize a risk of injury to a vehicle occupant upon contact with the free end of the spiral element. Furthermore, the ring element can be used to ensure a circumferentially uniform distribution of pressure from the beverage holder onto the beverage container held in the receptacle. This means that the risk of damage to the beverage container held in the holder as a result of a collision with the free end of the spiral element can be kept particularly low.

In this context, it can also be provided that the ring element is flush with the storage element towards the storage surface in the stowed position. This means that the ring element does not protrude over the storage surface in the stowed position, but together with the storage surface provides a smooth outer surface of the cup holder device. In this way, the risk of damage to the beverage holder, in particular to the ring element in the stowed position of the beverage holder device, can be kept particularly low. In addition, a particularly smooth appearance of the beverage holder device can be made possible in its stowed position.

In a further embodiment of the invention, it is provided that the spiral element engages with its end associated with the drive element in a guide groove of the drive element, whereby a rotational movement of the drive element results in a rotational movement of the spiral element. By means of the engagement of the end associated with the drive element in the guide groove of the drive element, the spiral element is connected to the drive element in a rotationally fixed manner. By guiding the end of the spiral element associated with the drive element in the guide groove, the spiral element can be moved translationally relative to the drive element. In particular, guiding the end associated with the drive element in the guide groove enables the spiral element to be adjusted in height relative to the storage element. The guide groove runs with its longitudinal extension direction in particular at least substantially parallel to an adjustment direction of the spiral element relative to the storage element when adjusting the beverage holder device between the stowed position and the at least one use position. For an adjustment of the beverage holder device, the drive element can thus be set in rotation via the drive device, as a result of which the rotational movement of the spiral element relative to the storage element is triggered via the rotationally fixed connection of the spiral element to the drive element. The rotationally fixed connection of the drive element to the spiral element enables particularly simple and precise adjustment of the cup holder device between the stowed position and the at least one position of use.

In a further embodiment of the invention, it is provided that the beverage holder device comprises two spiral elements which are arranged concentrically with respect to one another and have diameters which differ from one another and which can each be adjusted in height independently of one another relative to the storage element. This means that a first of the spiral elements is surrounded on the outer circumference by the second spiral element in the stowed position. Depending on the size of the beverage container to be accommodated, the first spiral element or the second spiral element can be adjusted in height relative to the storage element when the beverage holder device is moved from the stowed position to the at least one position of use. Thus, if a small beverage container is to be accommodated by the beverage holder device, then the first spiral element can be extended over the storage surface by means of the drive device. If a comparatively larger beverage container is to be accommodated in the beverage holder device, then the second spiral element can be extended over the storage surface by means of the drive device. This enables the beverage holder device to adapt a size of the receptacle, in particular a diameter of the receptacle, particularly well to a respective size of the beverage container, as a result of which the beverage container can be received particularly securely in the receptacle of the beverage holder device.

In this context, it can be provided in particular that the cup holder device comprises a separate drive element for each spiral element. The respective drive elements can each be set up to be set in rotation by a motor, in particular an electric motor of the drive device. In particular, the drive elements are designed to be set in rotation separately from one another. By providing respective drive elements for each spiral element, the spiral elements are particularly easy to adjust independently of one another relative to the storage element.

In a further embodiment of the invention, the beverage holder device comprises a coupling device which is arranged to switch between a power transmission from a motor of the drive device to a first drive element and a power transmission from the motor to the second drive element. Here, the first drive element is associated in particular with the first spiral element and the second drive element is associated with the second spiral element. This means that the first drive element is arranged to adjust the first spiral element relative to the deposit element and the second drive element is arranged to adjust the second spiral element relative to the deposit element. The coupling device makes it possible to provide only one motor of the drive device, by means of which both the first drive element and the second drive element can be set in rotation. This allows the cup holder device, in particular the drive device of the cup holder device, to be designed in a particularly compact manner.

In a further embodiment of the invention, it is provided that in the stowed position the two spiral elements are arranged to surround each other circumferentially, the first drive element assigned to the inner spiral element, in particular the first spiral element, is surrounded circumferentially on the outside by the inner spiral element, and that the second drive element assigned to the outer spiral element, in particular the second spiral element, surrounds the outer spiral element circumferentially on the outside. This means that, starting from an axis of rotation radially from the inside to the outside, the first drive element is arranged, the inner spiral element surrounds the first drive element, the outer spiral element surrounds the inner spiral element, and finally the second drive element surrounds the outer spiral element on the outer circumferential side. In order to be able to guide the respective ends of the spiral elements assigned to the drive elements in the assigned guide grooves of the drive elements, it is provided that the end of the inner spiral element assigned to the first drive element is bent inward and thus facing the first drive element. Furthermore, it is provided that the end of the second spiral element assigned to the second drive element is bent outward and thus facing the second drive element. The end of the spiral element associated with the respective drive element is a lower end of the spiral element in the installation position of the cup holder device in the vehicle. The beverage holder device can be made particularly compact by arranging the drive elements and the spiral elements so that they surround one another.

Further advantages, features and details of the invention may be obtained from the following description of possible embodiments and from the drawing. The features and combinations of features mentioned above in the description as well as the features and combinations of features shown below in the figure description and/or in the figures alone can be used not only in the combination indicated in each case, but also in other combinations or on their own, without leaving the scope of the invention.

BRIEF DESCRIPTION OF THE SEVERAL VIEWS OF THE DRAWINGS

Further advantages, features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

An advantageous embodiment of the invention is explained below with reference to the accompanying figures, wherein:

FIG. 5 depicts schematic sectional view of the beverage holder device in the region of the beverage holders arranged concentrically with respect to one another, a first beverage holder projecting beyond the storage surface of the storage element, as a result of which the receptacle for the beverage container is laterally delimited by the first beverage holder, and the second beverage holder terminating flush with the storage surface or remaining behind the storage surface, a drive element which can be set in rotation via the drive device being provided for each beverage holder;

FIG. 6 depicts schematic perspective view of the cup holder device according to FIG. 5;

FIG. 7 depicts schematic perspective view of the cup holder device in the use position, wherein the cup holder is provided by a tubular portion having a threaded portion on the outside thereof which forms a helical engagement with the storage member; and FIG. 8 schematic sectional view of the cup holder device according to FIG. 7.

DETAILED DESCRIPTION OF THE SEVERAL VIEWS OF THE DRAWINGS

Figure 1:
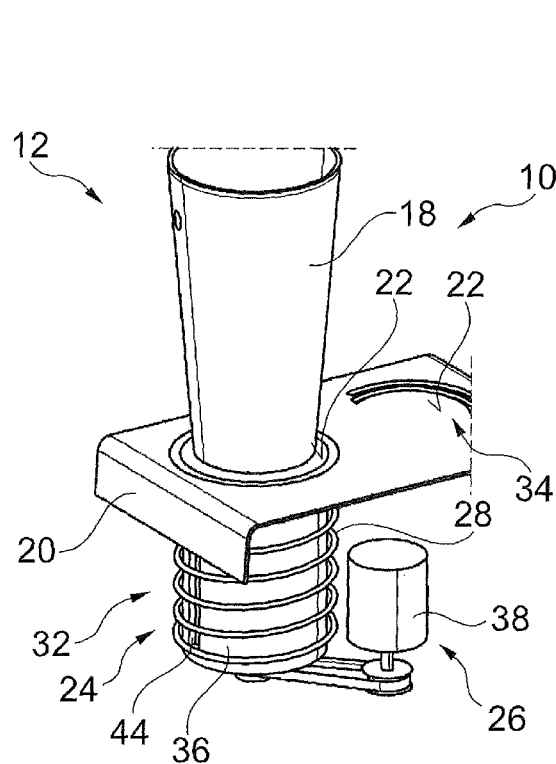
FIG. 1 depicts a beverage holder device for a vehicle, with a storage element providing a storage surface and with at least one beverage holder comprising a spiral element, which can be adjusted in height relative to the storage element, whereby a receptacle for a beverage container can be provided, and with a drive device, which comprises a drive element via which the beverage holder can be set in rotation relative to the storage element, whereby via a helical engagement between the beverage holder and the storage element the beverage holder can be adjusted in height relative to the storage element, wherein the beverage holder device is shown in a stowed position.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of do not necessarily modify an entirety of the following list and do not necessarily modify each member of the list, such that "at least one of "A, B, and C" should be understood as including not only one of A, only one of B, only one of C, or any combination of A, B, and C.

In the figures, identical reference signs are assigned to identical elements and elements with identical functions.

In FIGS. 1 to 6, a beverage holder device 10 for a vehicle, in particular for a motor vehicle, in particular for a motor vehicle, is shown in a first embodiment. In FIGS. 7 and 8, the beverage holder device 10 is shown in a second embodiment. The beverage holder device 10 is adapted to be adjusted between a stowed position 12 and at least one use position 14. In the use position 14, the beverage holder device 10 provides a receptacle 16 in which a beverage container 18 can be received. This beverage container 18 can in particular be a cup, a bottle or a beverage can.

In any embodiment, the beverage holder device 10 includes a storage element 20 that provides a storage surface 22 for the beverage container 18. The beverage container 18 can be placed on this storage surface 22 to be received in the receptacle 16. In particular, the storage surface 22 provides a bottom surface of the receptacle 16 in the use position 14.

In each of the embodiments, the beverage holder device 10 comprises at least one beverage holder 24 and a drive device 26 by means of which the beverage holder 24 can be adjusted in height relative to the storage element 20. The respective beverage holder 24 is thus arranged to terminate flush with the storage surface 22 or to project behind the storage surface 22 in the stowed position 12 and to project beyond the storage surface 22 in the use position 14, thereby providing a wall which delimits the periphery of the receptacle 16.

The first embodiment and the second embodiment differ in that the cup holder device 10 in the first embodiment comprises a plurality of cup holders 24, whereas the cup holder device 10 in the second embodiment comprises only a single cup holder 24. Further, the respective cup holders 24 of the first embodiment of the cup holder device 10 each comprise a spiral element 28, whereas the cup holder 24 of the second embodiment comprises a tubular portion 30 having a threaded portion 32. In the threaded section 32, the tubular section 30 has a spiral protrusion on its outer surface facing away from the receptacle 16, as can be seen in FIGS. 7 and 8. The spiral element 28 also has a threaded section 32 due to its spiral shape. With this thread-shaped section 32, the respective cup holders 24 are in a helical engagement with the storage element 20. For this helical engagement, the storage element 20 has a spiral-shaped guide 34 in which the thread-shaped section 32 of the beverage holder 24 can be guided. During a height adjustment of the beverage holder 24 relative to the storage element 20, the thread-shaped section 32 is guided in the spiral-shaped guide 34, whereby a rotational movement of the respective beverage holder 24 relative to the storage element 20 results in a translational movement and thus a height adjustment of the respective beverage holder 24 relative to the storage element 20.

The drive device 26 comprises a drive element 36, which is connected to the beverage holder 24 in a rotationally fixed manner. In the present case, the drive device 26 has a separate drive element 36 for each beverage holder 24. Relative to the drive element 36, the beverage holder 24 may be translationally adjustable, in particular along a central axis of the beverage holder 24. The translational adjustability of the beverage holder 24 relative to the associated drive element 36 thus allows the beverage holder 24 to be vertically adjustable relative to the storage element 20. The drive device 26 may further comprise a motor 38, by means of which the drive element 36 may be rotated via a belt drive. Thus, the motor 38 is adapted to cause the beverage holder 24, which is non-rotatably connected to the drive element 36, to rotate via the drive element 36. The motor 38 in the present case is an electric motor.

Figure 2:
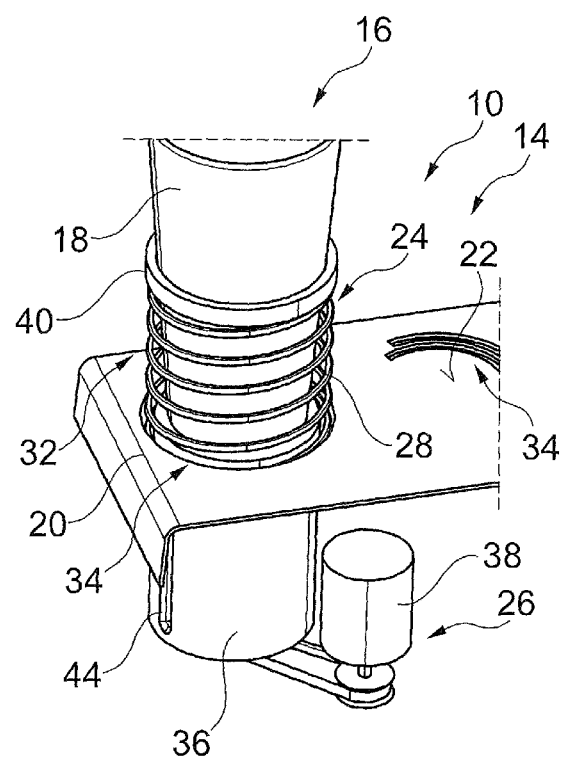
FIG. 2 depicts a schematic perspective view of the beverage holder device according to FIG. 1 in a position of use, in which the beverage holder protruding over the storage surface provided by the storage element delimits a receptacle on the circumferential side, in which the beverage container can be accommodated.
Figure 3:
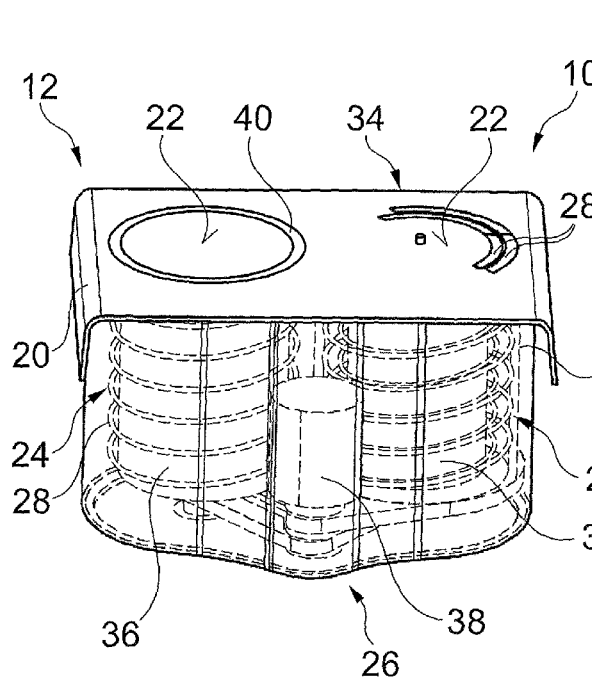
FIG. 3 depicts schematic perspective view of the cup holder device in the stowed position, in which the cup holder device comprises three cup holders, of which two cup holders are arranged concentrically to one another and are thus assigned to an identical region of the storage surface, and the third cup holder is spaced apart and is thus arranged next to the cup holders, the further cup holder being assigned to a further region of the storage surface, the drive device being set up to adjust the height of the cup holders separately from one another relative to the storage surface.

In FIG. 1, the cup holder device 10 is shown in the stowed position 12. In FIG. 2, the same cup holder device 10 is shown in a position of use 14. In this position of use 14, one of the cup holders 24 has been arranged projecting over the storage surface 22 by means of the drive device 26. In FIG. 3, all cup holders 24 of the cup holder device 10 are shown flush with the storage surface 22 or arranged projecting behind the storage surface 22. Here, different possible designs or arrangements of the cup holders 24 in the cup holder device 10 are shown, which can be combined with each other as desired. As can be seen particularly well in FIGS. 2 and 3, the beverage holder 24 can be terminated by a ring element 40 held at a free end of the spiral element 28. In the use position 14 of the beverage holder 24, this ring element 40 limits the receptacle 16 to its side facing away from the storage element 20 and thus upwards. In the stowed position 12, the ring element 40 closes flush with the storage surface 22 in an upward direction. Alternatively, in the stowed position 12, the ring element 40 may be stowed behind the storage surface 22 in a stowed position 12 of the beverage holder device 10.

If the cup holder device 10 includes a plurality of cup holders 24, then the cup holders 24 may be arranged side by side or concentrically with respect to each other. In FIG. 3, two of the cup holders 24 are arranged concentrically with respect to each other and another cup holder 24 is arranged adjacent to these concentrically arranged cup holders 24. Of the concentrically arranged cup holders 24, a first cup holder 24 is circumferentially outwardly enclosed by the second cup holder 24 in the stowed position 12 of the cup holder device 10. In the present case, the beverage holders 24 arranged concentrically with respect to one another are beveled in a wedge-shaped manner at their free end, as a result of which a risk of injury to vehicle occupants in the event of the beverage holders 24 projecting beyond the storage surface 22 can be kept particularly low. Presently, a separate drive element 36 is associated with each of the cup holders 24. In order to be able to adjust the height of all the cup holders 24 independently of one another relative to the storage surface 22 by means of a single motor 38 of the drive device 26, the drive device 26 can comprise a coupling device not shown in the figures, by means of which it can be set which of the drive elements 36 is to be set in rotation by the motor 38.

Figure 4:
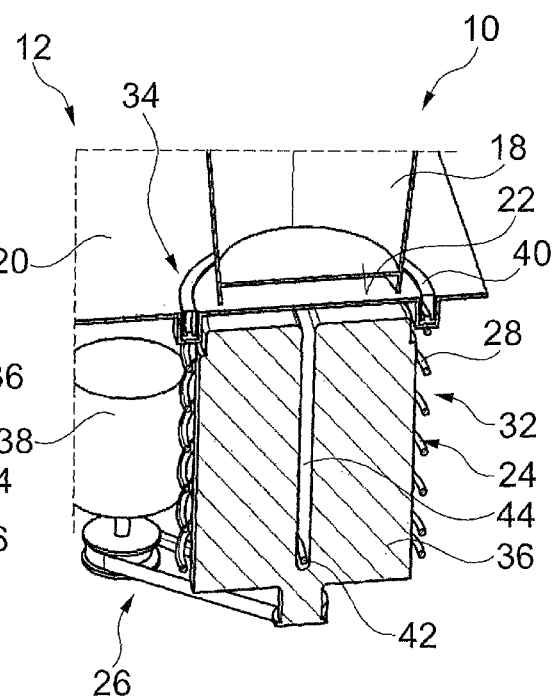
FIG. 4 depicts schematic sectional view through the beverage holder device in the stowed position, wherein the beverage holder is arranged circumferentially surrounding a drive element of the drive device and an end of the spiral element of the beverage holder shown, which end is associated with the drive element, is inserted in a guide groove of the drive element, as a result of which the beverage holder can be adjusted in height relative to the drive element and relative to the storage element.

In order to ensure, on the one hand, a rotationally fixed connection between the respective beverage holders 24 and the associated drive element 36 and, on the other hand, to enable translational movement of the respective beverage holders 24 relative to the associated drive element 36 along the axis of rotation, it is provided that an end of the respective beverage holder 24 associated with the respective drive element 36, in this case a lower leg arm 42, engages in a guide groove 44 of the drive element 36. This guide groove 44 runs with its longitudinal extension direction parallel to the axis of rotation of the drive element 36 or of the beverage holder 24, as can be seen in FIG. 4.

The beverage holders 24, which are arranged concentrically with respect to one another, can be seen particularly well in FIGS. 5 and 6, in which the first beverage holder 24 for providing the receptacle 16 protrudes above the storage surface 22. As can be seen in FIG. 5, a first drive element 36 is provided for the first, inner cup holder 24 and a second drive element 36 is provided for the second, outer cup holder 24. In the stowed position 12 of the beverage holder device 10, the second drive element 36 surrounds both beverage holders 24 arranged concentrically with respect to one another and the first drive element 36 on the outer circumferential side. In the stowage position 12, the two spiral elements 28 arranged concentrically to one another are thus arranged circumferentially surrounding one another. Here, the first drive element 36 associated with the inner spiral element 28 is surrounded by the inner spiral element 28 on the outer circumferential side. Furthermore, the second drive element 36 associated with the outer spiral element 28 surrounds the outer spiral element 28 on the outer circumferential side. To ensure the respective rotationally fixed connection of the first beverage holder 24 to the first drive element 36 and of the second beverage holder 24 to the second drive element 36, the lower leg arm 42 of the first beverage holder 24 engages in the guide groove 44 of the first drive element 36 and the lower leg arm 42 of the second beverage holder 24 engages in the guide groove 44 of the second drive element 36. For this purpose, the lower leg arm 42 of the first spiral element 28 is bent radially inwards, whereas the lower leg arm 42 of the second spiral element 28 is bent radially outwards.

FIGS. 7 and 8 show the beverage holder device 10 in its second embodiment in the use position 14. The arrangement of the cup holder 24 of the second embodiment of the cup holder device 10 may be combined with the arrangement of the cup holders 24 of the first embodiment of the cup holder device 10. That is, the second embodiment of the beverage holder device 10 may provide a plurality of beverage holders 24, which may be arranged side by side or concentrically with respect to each other.

For an adjustment of the cup holder device 10 between the stowed position 12 and the at least one position of use 14, the respective drive element 36 driven by the motor 38 can rotate the associated spiral element 28, which can in particular be a spiral spring, into a desired holding position. In the unused state and thus in the stowed position 12 of the beverage holder device 10, only the ring element 40 is visible on a side of the beverage holder device 10 facing the interior of the vehicle, in particular when looking at the storage surface 22, which ring element 40 can indicate a storage position for the beverage container 18. A lower spring leg, in this case the end of the spiral element 28 associated with the drive element 36, slides in a slot-shaped opening, in this case the guide groove 44 of the drive element 36, when the cup holder device 10 is moved from the stowed position 12 into the at least one position of use 14, the spring leg slides upwards in the slot-shaped opening. A counterpart in a surface of the vehicle, presently in the storage element 20, is the spiral-shaped guide 34, which serves as an abutment for the movement. The spiral element 28 can thus be screwed through a decorative surface of the storage element 20, presently through the storage surface 22. The abutment has particularly good sliding properties and can be fixed in a common housing with the spiral element 28, the respective associated drive element 36 and the motor 38. The ring element 40 can be replaced by an end cap at the free end of the respective spiral element 28. In the stowed position 12, only a ramp-shaped recess may then be visible in the storage element 20, through which the respective beverage holder 24 can unscrew from the storage element 20. If the beverage holder 24 has the ring element 40, then an annular recess can be provided in the storage element 20 in the region of the spiral-shaped guide 34.

When providing the beverage holders 24 arranged concentrically to each other, the first spiral element 28, which is smaller in diameter, can be arranged inside the second spiral element 28 with the larger diameter, which can be used for smaller beverage containers 18. Both spiral elements 28 can be driven by means of a common motor 38. A change of a drive between the smaller diameter first spiral element 28 to the larger diameter second spiral element 28 can be performed by means of a magnetic coupling.

Instead of the spiral element 28, the beverage holder 24 may comprise the tubular section 30, which may be moved upwardly like a screw by the storage element 20 when the beverage holder device 10 is moved from the stowed position 12 to the at least one use position 14, thereby providing a closed envelope for the beverage container 18 to be held. A drive mechanism, as well as other functions of the beverage holder 24 comprising the tubular portion 30, may be implemented in accordance with the functions described in connection with the first embodiment of the beverage holder device 10, as well as the drive mechanism 26 described.

Overall, the invention shows how an electromechanical cupholder, presently the cupholder device 10, can be provided.

The figures are merely schematic representations and serve only to explain the invention. Elements that are identical or have the same effect are consistently marked with the same reference signs.

What is claimed is:

1. A beverage holder device for a vehicle, the beverage holder device configured to adjust between a stowed position and at least one position of use, the beverage holder device comprising:

a storage element comprising a storage surface configured to receive the beverage container, the storage surface further configured to, in the position of use, provide a bottom surface of a receptacle for the beverage container, a beverage holder configured to provide a wall peripherally defining the receptacle in the use position and to terminate flush with the storage surface or below the storage surface in the stowed position, the beverage holder forming a helical engagement with a further element, and a drive device comprising a drive element arranged to trigger a rotational movement of the beverage holder relative to the further element, whereby the beverage holder is configured to be adjustable in height relative to the storage element for adjusting the beverage holder device between the stowed position and the position of use, and wherein the cup holder is configured to form the helical engageme t with the storage element as a further element, and in that the drive element is arranged t set the cup holder in rotation relative to the storage element: and wherein the cup holder further comprises a spiral member adapted to provide the wall and which is guided in a spiral guide of the tray member, thereby providing the helical engagement between said cup holder and said tray member.

2. The beverage holder device according to claim 1, wherein the beverage holder is closed off by a ring element held at a free end of the spiral element, wherein the ring element, in the position of use, bounds the receptacle towards its side facing away from the deposit element.

3. The beverage holder device according to claim 2, wherein, in the stowed position, the ring element terminates flush with the storage element towards the storage surface.

4. The beverage holder device according to claim 1, wherein the spiral element is arranged to engage with its end associated with the drive element in a guide groove of the drive element, whereby a rotational movement of the drive element results in a rotational movement of the spiral element.

5. The beverage holder device according to claim 1, wherein two spiral elements are arranged concentrically with respect to one another, have diameters which differ from one another and are configured to adjust in height independently of one another relative to the storage element.

6. The beverage holder device according to claim 5, further comprising a drive element for each spiral element.

7. The beverage holder device according to claim 6, further comprising a clutch device arranged to switch between a power transmission from a motor of the drive device to a first drive element and a power transmission from the motor to the second drive element.

8. The beverage holder device according to claim 5, wherein, in the stowage position, the two spiral elements are arranged circumferentially surrounding one another, the first drive element associated with the inner spiral element is circumferentially surrounded on the outside by the inner spiral element, and the second drive element associated with the outer spiral element circumferentially surrounds the outer spiral element on the outside.

* * * * *